(12) United States Patent
Nothdurft et al.

(10) Patent No.: US 8,741,208 B2
(45) Date of Patent: Jun. 3, 2014

(54) MANUFACTURING A COMPOSITE COMPONENT

(75) Inventors: Matthias Nothdurft, Haubersbronn (DE); Günther Dressler, Immenstaad (DE); Rolf-Georg Sundermann, Buxtehude (DE); Georg Lonsdorfer, Stade (DE)

(73) Assignee: Airbus Operations GmbH, Hamburg (DE)

( * ) Notice: Subject to any disclaimer, the term of this patent is extended or adjusted under 35 U.S.C. 154(b) by 73 days.

(21) Appl. No.: 13/274,736

(22) Filed: Oct. 17, 2011

(65) Prior Publication Data

US 2012/0267824 A1    Oct. 25, 2012

Related U.S. Application Data

(63) Continuation of application No. PCT/EP2010/053199, filed on Mar. 12, 2010.

(60) Provisional application No. 61/169,624, filed on Apr. 15, 2009.

(30) Foreign Application Priority Data

Apr. 15, 2009    (DE) .......................... 10 2009 017 512

(51) Int. Cl.
*B29C 43/56*    (2006.01)

(52) U.S. Cl.
USPC ........... 264/544; 264/257; 264/510; 264/546; 264/547; 264/570; 425/389; 425/390; 425/387.1; 425/503; 425/342.1; 425/405.1

(58) Field of Classification Search
USPC ........ 425/389, 390, 387.1, 503, 342.1, 405.1; 264/257, 510, 544, 546, 547, 570
See application file for complete search history.

(56) References Cited

U.S. PATENT DOCUMENTS

| 5,152,949 A | 10/1992 | Leoni et al. |
| 6,192,048 B1 | 2/2001 | Nelson et al. |

(Continued)

FOREIGN PATENT DOCUMENTS

| CA | 2188629 C | 6/2005 |
| DE | 19630840 C1 | 2/1998 |

(Continued)

OTHER PUBLICATIONS

EPO English machine translation of DE 19630840, retrieved Apr. 2, 2013.*

(Continued)

*Primary Examiner* — Timothy Kennedy
(74) *Attorney, Agent, or Firm* — Ingrassia Fisher & Lorenz P.C.

(57) ABSTRACT

Manufacturing of a composite component, such as a composite component of an aircraft, is provided with a molding tool that includes, but is not limited to, a first mold, a second mold and a pressure generator. Between the first mold and the second mold, a membrane is arranged so that between the first mold and the membrane a first region is formed, and between the second mold and the membrane a second region is formed. In the first region, a fibrous mat is arranged. In the second region with the use of the pressure generator 116 counter-pressure can be produced so that the membrane is pressed in the direction of the fibrous mat.

14 Claims, 3 Drawing Sheets

(56) References Cited

U.S. PATENT DOCUMENTS

| | | | |
|---|---|---|---|
| 6,203,304 B1 * | 3/2001 | Lopez Tonazzi et al. | 425/110 |
| 7,866,969 B2 | 1/2011 | Ruiz et al. | |
| 2006/0073373 A1 * | 4/2006 | Andrin et al. | 429/36 |
| 2008/0053609 A1 | 3/2008 | Renz | |
| 2008/0093761 A1 | 4/2008 | Hansen | |
| 2010/0019405 A1 | 1/2010 | Eberth et al. | |
| 2011/0180960 A1 * | 7/2011 | Blot et al. | 264/257 |

FOREIGN PATENT DOCUMENTS

| | | |
|---|---|---|
| DE | 10007373 C1 | 11/2000 |
| DE | 20116817 U1 | 1/2002 |
| DE | 102009053691 A1 | 5/2011 |
| EP | 0491646 A2 | 6/1992 |
| EP | 1013409 A2 | 6/2000 |
| EP | 1992467 A1 | 11/2008 |
| GB | 1181383 A | 2/1970 |
| WO | 2005000566 A1 | 1/2005 |
| WO | 2007054268 A1 | 5/2007 |

OTHER PUBLICATIONS

EPO English machine translation of EP 1992467, retrieved Apr. 2, 2013.*

German Office Action dated Dec. 17, 2009 for German Application No. 102009017512.1.

Weyrauch, F.; Stadtfeld, H.; Kissinger, C., "Resin Injection Methods", "Handbook of Composite Materials", Ed. Neitzel, M.; Mitschang, P., pp. 271-292 (introduction included only), 2004, Carl Hanser Verlag, Munich, Germany.

German Patent Office, German Office Action dated Feb. 15, 2013 for German Patent Application No. 102009017512.1.

International Search Report dated Oct. 25, 2010 for International Application No. PCT/EP2010/053199.

International Preliminary Report on Patentability dated Oct. 18, 2011 for International Application No. PCT/EP2010/053199.

* cited by examiner

MANUFACTURING A COMPOSITE COMPONENT

CROSS REFERENCE TO RELATED APPLICATION

This application is a continuation of International Application No. PCT/EP2010/053199, filed Mar. 12, 2010, which was published under PCT Article 21(2) and which claims priority to German patent application 10 2009 017 512.1, filed 15 Apr. 2009 and of U.S. Provisional Patent Application 61/169,624 filed 15 Apr. 2009, the disclosure of which applications is hereby incorporated herein by reference.

TECHNICAL FIELD

This technical field relates to manufacturing a composite component. In particular, the invention relates to a molding tool for manufacturing a composite component, to a method for manufacturing a composite component, and to the use of a molding tool for manufacturing the composite component for an aircraft.

BACKGROUND

Composite components may be manufactured using the resin transfer molding (RTM) method. In this type of manufacture of composite components a fibrous mat is arranged in a molding-tool cavity of a molding tool, and thereafter when the molding tool is completely closed, is impregnated with resin. The fibrous mat may be designed in various ways, for example it may comprise individual non-interwoven fibers, a woven fiber fabric or a fibrous web. The fibers may, for example, be carbon fibers. While the fibrous mat is being impregnated with resin, as a rule synthetic resin such as, for example, epoxy resin, the liquid resin fully takes up the space in the molding-tool cavity. Subsequently, the resin cures or solidifies within the molding-tool cavity, for example as a result of a chemical reaction triggered by heating the resin, and a composite component is produced that comprises the fibrous mat and the cured resin.

From DE 10 2005 053 691 A1 or WO 2007 054 268 A1 a molding tool for implementing the RTM method is known. During the curing process the volume of resin is reduced up to approximately 3%. With the use of semi-finished fiber products with additional material that during infiltration by the resin dissolves with the resin, for example in order to modify mechanical characteristics of the resin, the volume of the semi-finished fiber product after infiltration may be reduced by up to approximately 20% when compared to the state before infiltration. This may result in a situation in which, above all in the case of a composite component comprising particularly thick sections, as a result of volume shrinkage the composite component no longer has the geometry defined by the molding-tool cavity. Furthermore, because the pressure in the molding tool is reduced as a result of shrinkage, blistering may occur in the composite component, which blistering reduces the local strength of the composite component.

From EP 1 013 409 A2 a method is known in which instead of an inflexible counter-mold a flexible membrane is used. A fibrous mat is placed on an inflexible negative mold and is covered by means of the flexible membrane. Counter-pressure is applied to the membrane so that a molded part arises whose one side is shaped like the negative mold. No predefined geometry may be specified for the other side, which rests against the flexible membrane, of the composite component to be manufactured.

In view of the foregoing it is at least one object to be able to produce composite components of uniform strength and precisely predetermined geometric shapes. In addition, other objects, desirable features and characteristics will become apparent from the subsequent summary and detailed description, and the appended claims, taken in conjunction with the accompanying drawings and this background.

SUMMARY

According to an embodiment of the invention, a molding tool for manufacturing a composite component is provided. The molding tool comprises a first mold, a second mold and a pressure generating means, wherein between the first mold and the second mold or further molded parts a membrane is arrangeable, so that between the first mold and the membrane a first region is formed, and between the second mold and the membrane a second region is formed, wherein in the first region a fibrous mat is arrangeable. The fibrous mat is resin-impregnated or resin-impregnable. In the second region with the use of the pressure generating means counter-pressure can be produced or counter-pressure is producible so that the membrane is being pressed or is pressed in the direction of the fibrous mat (when the counter-pressure has built up).

For manufacturing a composite component a molding tool is used that comprises at least two molds, for example a first rigid mold and a second rigid mold. The molding tool may also comprise several parts. A tightly closing membrane, formed over one or several of the molding-tool surfaces, forms a pressurizable space, the second region. Counter-pressure in the second region may be generated by any desired fluid, for example a liquid, for example water, or a gas, for example air. Counter-pressure may result in that the pressure in the second region exceeds the pressure in an environment of the molding tool, or in that the pressure in the second region exceeds the pressure in the first region. Counter-pressure may also arise as a result of overpressure or may be overpressure.

As a result of inflexible or stiff molding-tool surfaces that encompass the composite component or the fibrous mat on both sides a defined component thickness or precisely calibrated component areas may be manufactured.

The membrane may be completely impervious to fluid. The membrane may be a foil or film, for example a plastic foil or film or a metal foil, but it may also be a membrane comprising or being of rubber. The membrane may also be partially fluid-permeable, for example by means of pores. In this case the counter-pressure in the second region may be maintained in that fluid is continuous supplied to the second region.

The first mold may be a top mold and the second mold may be a bottom mold. As a result of this the membrane is pressed upwards by the counter-pressure. As a result of gravity the resin may flow through the fibrous mat in the direction of the membrane. As an alternative it is also possible for the first mold to be a bottom mold, and for the second mold to be a top mold. In this way it is possible in a simple manner for the fibrous mat to be placed on the second mold, and for the membrane to be arranged above it.

The notion of the membrane being pressed in the direction of the fibrous mat may on the one hand mean that the membrane moves in the direction of the fibrous mat, and on the other hand it may also mean that the membrane exerts pressure on the fibrous mat without moving.

By pressing the membrane in the direction of the fibrous mat the shrinkage resulting from the reaction of the resin during curing, or the volume change of the semi-finished fiber product during injection may be compensated for. Furthermore, in this manner already with the molding tool partly open a homogeneous filling of the first region with resin may also be achieved in the case of thickness fluctuations of the component. Likewise, a homogeneous filling is also possible in the case of components with sections that are situated normally or not normally relative to the vector of the tool closure. Thus fiber impregnation in the case of components with sudden differences in the thickness of the wall becomes better controllable. Moreover, a variation in the stroke or settlement of surfaces that are situated normally or not normally relative to the closing direction of the molding tool may be controlled better. As an alternative to introducing the resin in the molding-tool cavity, fibrous mats that are already resin-impregnated, as is the case in the pre-pregnated method, may be arranged in the molding tool.

According to an embodiment the molding tool comprises a resin supply device and, for example, a closable resin outlet. By way of the resin supply device resin for impregnating the fibrous mat may be supplied to the molding tool to the first region.

The fibrous mat may also be resin-impregnated with the molding tool open, because the membrane pressed in the direction of the fibrous mat prevents the resin from flowing out of the open molding tool. By means of the counter-pressure in the second region the intensity with which the membrane is pressed in the direction of the fibrous mat may be set. In this manner, despite the high flow resistance of the resin, the infusion time may be shortened when compared to that of the RTM method. By means of variation of the pressure in the pressurized second space or region the flow resistance during fiber impregnation may be set.

The resin supply device may comprise a connection of the molding tool, by way of which connection resin may be conveyed under pressure by way of a line from a resin reservoir into the first region. The first region may also comprise a further connection, by way of which connection air or water or generally a fluid may be removed by suction from the first region. In this process it may be ensured that during resin impregnation of the fibrous mat no fluid remains in the first region.

According to an embodiment the resin supply device is formed or situated in the first mold. To this effect the first mold may comprise one or several holes by way of which the resin is conveyed to the first region.

According to a further embodiment the pressure generating means comprises a fluid supply device, wherein fluid for producing the counter-pressures may be supplied, or is suppliable, to the molding tool with said fluid supply device. The counter-pressure may be produced or may be producible by supplying a fluid with a fluid line from a fluid reservoir.

According to an embodiment the fluid supply device may be formed or situated in the second mold. To this effect the second mold may comprise one or several holes by way of which the fluid may be conveyed to the second region.

According to an embodiment a molding tool is provided with a section of the first mold that defines the surface geometry of a first side of the composite component, and a section of the second mold defines the surface geometry of a second side of the composite component.

The geometry of the composite component may be defined completely by the opposing sections. Moreover, the surface of the composite component, which surface faces the membrane, may be defined by the interior geometry of the molding tool. Because of the geometry of the composite component, which geometry may be precisely defined by means of the molding tool, the composite component comprises a precisely determinable thickness at each position. Furthermore, the fiber volume content, in other words the ratio of resin to fibers, may be precisely set.

According to a further embodiment a molding tool is provided with the first mold and the second mold that may be moved towards each other until a final position is reached in which the first mold and the second mold rest against each other. In the final position a cavity is formed between the first mold and the second mold. The final position may also be reached if there is still a small residual closing distance between the molds.

If the first mold and the second mold rest against each other or abut, a cavity is formed by the sections of the first mold and the second mold, which cavity defines the geometry of the composite component.

According to an embodiment the cavity defines the geometry of the composite component to be produced. This cavity may be separated into the two regions by the membrane.

According to an embodiment a molding tool is provided with the first mold and the second mold that are movable towards each other up to an intermediate position in which the first mold and the second mold may be further movable towards each other.

According to an embodiment in the intermediate position the first region is sealed with respect to the environment of the molding tool. In this way in the intermediate position of the molding tool a space, the first region, is created in which the fibrous mat may be resin impregnated. Resin may not leave the first region during impregnation.

According to a further embodiment in the intermediate position the second region is sealed with respect to the environment of the molding tool. Already in the intermediate position the second region may be pressurized. In the intermediate position the second region is sealed with respect to the environment and in this way may be pressurized, for example by feeding a fluid at pressure, in order to generate the counter-pressure in the second region.

According to an embodiment the molding tool comprises a seal for sealing the first region. In the intermediate position the first region may be sealed with respect to the environment of the molding tool by means of the seal.

According to an embodiment the molding tool comprises a first seal for sealing the first region and/or the second region. The first seal may have a first protrusion over the surface of the first mold and/or the second mold. The first seal may comprise several single seals.

The seal may seal the first region between the intermediate position and the final position of the molding tool. To this effect the first seal may have a high gap tolerance between the molding tool segments. This may be affected in that the seal comprises a protrusion beyond the surface of the first or the second mold. The seal may be attached to the first mold or the second mold.

According to an embodiment, the seal may also seal the second region. The seal may seal the second region between the intermediate position and the final position of the molding tool with respect to the environment of the molding tool. If the seal has been affixed to the first mold, from the first intermediate position the first region may be closed off or delimited by a section of the first mold and a section of the membrane within the seal. The second region may be closed off by a section of the second mold and the section of the membrane within the seal.

According to an embodiment a molding tool is provided which apart from the first seal comprises a second seal for sealing the first region and/or the second region. This may be affected in that the second seal protrudes from a surface of the first or of the second mold. The second seal may be arranged outside the first seal. In this arrangement the first seal may be attached to the first mold, and the second seal may be attached to the second mold. Both seals may comprise identical protrusions and/or may protrude identical.

According to an embodiment the molding tool comprises a second seal for sealing the first region and the second region, wherein the first seal is mounted to the first mold and has the first protrusion over the surface of the first mold. The second seal is mounted to the second mold and has a second protrusion over the surface of the second mold.

The first seal and/or the second seal may seal the cavity within the molding tool already at the stage in which the first and the second molds are in the intermediate positions. The seals may have a protrusion over the surfaces of the two molds, which protrusion corresponds to the gap tolerance of the molding tool in the intermediate position or is a slightly bigger.

According to an embodiment, the molding tool comprises a third seal for sealing the cavity in the final position of the molding tool. The third seal may comprise a protrusion that is smaller than the protrusion of the first or of the second seal. In this manner it may be ensured that the cavity, which in the final position of the molding tool may be very highly pressurized, is also sealed off with respect to the environment when the first seal or the second seal cannot remain completely tight when exposed to these pressures.

According to an embodiment the molding tool comprises a third seal for sealing the first region and the second region. The third seal may be mounted to the first mold. The third seal may comprise several single seals. According to an embodiment the third seal has a third protrusion that is smaller than the first protrusion and/or the second protrusion.

According to an embodiment the third seal is arranged more outside as the first seal and/or the second seal with respect to the first region and the second region. The second seal may be arranged more outside as the first seal.

According to an embodiment the membrane is mechanically connected to the second mold. The membrane may also be connected to the second mold when the molding tool is completely open and is not in the final position or in the intermediate position.

On the other hand, for each manufacturing process relating to one composite component a one-way membrane may be used, such that no cleaning of residual resin from the molding tool, at least on the membrane side, is necessary. In this arrangement the membrane may also remain on the component, for example bonded to the composite component. In this manner at the same time a possibility for component lamination is provided. On the other hand, the membrane may also assume further additional functions on the composite component, for example to make it possible for the composite component to be bonded better or for it to comprise a metallic surface.

A method is also provided for manufacturing a composite component. According to an embodiment the method comprises the steps of: arranging a fibrous mat in a first region between a first mold of a molding tool and a membrane arranged in the molding tool; moving the first mold and a second mold of the molding tool towards each other to an intermediate position in which a second region between the second mold and the membrane is sealed with respect to the environment of the molding tool; and generating counter-pressure in the second region so that the membrane is pressed in the direction of the fibrous mat. The fibrous mat may be resin impregnated or may be resin impregnable.

Even if the molding tool in the intermediate position is not completely closed to the final dimension, the second region between the membrane and the molding tool is pressurized, such that the membrane is pressed in the direction of the fibrous mat, thus pressurizing the first region between the molding tool and the membrane and pressurizing the fibrous mat located therein. In this manner, the resin impregnating of the fibrous mat, as well as the fiber volume content of the composite component, may be set by the counter-pressure generated in the second region.

According to an embodiment the method comprises supplying resin to the first region for impregnating the fibrous mat.

According to an embodiment the method comprises arranging the membrane between the first mold and the second mold.

According to an embodiment the method comprises moving the first mold and the second mold towards each other to a final position. In the final position between the first mold and the second mold a cavity is formed that defines the geometry of the composite component. In the final position the precise external or outer geometry of the composite component may be determined by the cavity.

According to an embodiment the method comprises impregnating the fibrous mat with resin, before the first mold and second mold are moved to the final position. For example, the fibrous mat may be already impregnated with resin, when it is laid or positioned in the molding tool. Also, the fibrous mat may be impregnated with resin in the molding tool, for example in the intermediate position.

According to an embodiment the method comprises connecting the membrane to the fibrous mat, for example by bonding. Bonding the membrane to the composite component may take place by means of the curing resin.

According to an embodiment the method comprises a sealing of the first region and/or the second region with a first seal and/or a second seal in the intermediate position. The sealing may be achieved in that the first seal and/or the second seal has a protrusion which corresponds to the gap tolerance of the molding tool in the intermediate position or that is bigger than the gap tolerance.

According to an embodiment the method comprises a sealing of the first region and/or the second region with a third seal in the end position. The third seal may have a smaller protrusion as the first seal or the second seal.

A molding tool is also provided for manufacturing a composite component for an aircraft. In particular for aircraft components a predefined uniform strength while achieving the lightest possible weight is advantageous. Because the fiber volume content may be set precisely, an optimal ratio of strength to weight may be achieved.

Below, the invention is described in detail with the use of exemplary embodiments with reference to the enclosed figs.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
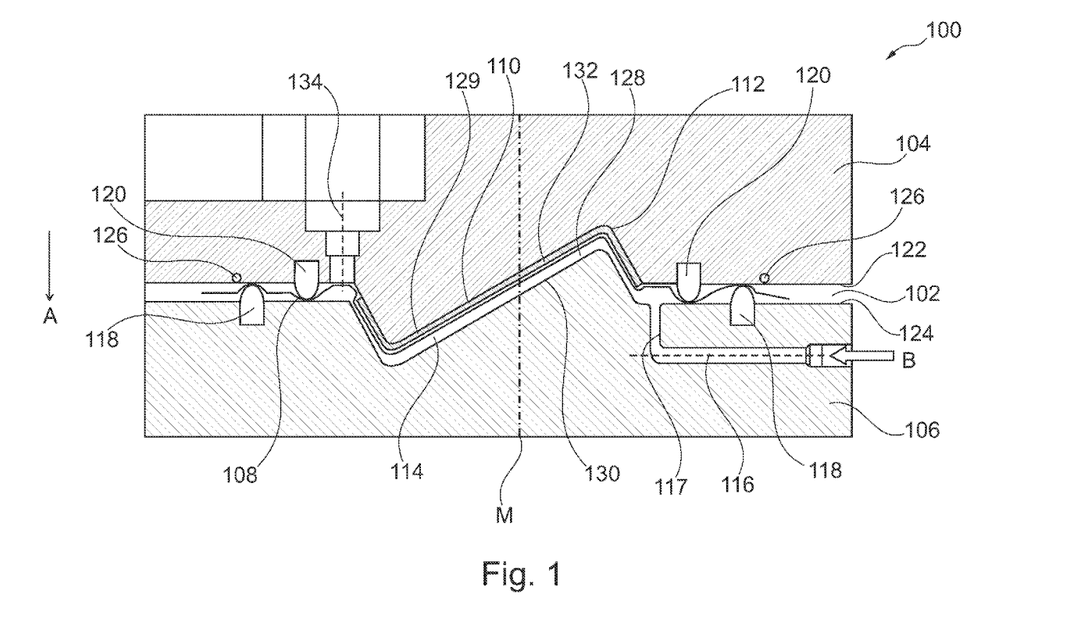
FIG. 1 shows a longitudinal section of a molding tool according to an exemplary embodiment.

FIG. 1 shows a molding tool 100 in an intermediate position in which the molding-tool gap 102 is not completely closed to its final dimension. The molding-tool gap 102 or the molding-tool cavity 102 is formed by a first mold 104 and a second mold 106. The molding tool may also comprise more than two molds, for example a plural number of molds or molding-tool parts. The second mold 106 is arranged in the direction of the arrow A below the first mold 104. The two molds 104 and 106 may be moved towards each other and away from each other in the direction of the arrow A.

Between the two molds 104 and 106 a membrane 108 is arranged. Between the membrane 108 and the first mold 104 a first region 110 is formed in which there is a fibrous mat 112. Opposite the fibrous mat 112 and the first region 110, on the other side of the membrane 108, there is a second region 114. The second region 114 is connected by way of an air supply device or a fluid supply device 116 as a pressure generating means in that, as indicated by the arrow B, air or fluid may be conveyed or pumped into the second region 114 in order to generate counter-pressure.

In order to seal the first region 110 and the second region 114 a first seal 120 is attached to the first mold, and a second seal 118 is attached to the second mold. In relation to a central axis M of the molding tool the first seal 120 completely encompasses the fibrous mat 112. In relation to the central axis M the second seal 118 completely encompasses the fibrous mat 112 and the first seal 120.

In this arrangement the first seal 120 protrudes beyond the surface 122 of the first mold 104 to such an extent that the first seal in the intermediate position shown in FIG. 1 in sections presses the membrane 108 against a surface 124 of the second mold 106. Likewise, the second seal 118 protrudes beyond the surface 124 of the second mold 106 to such an extent that the second seal in the intermediate position shown in FIG. 1 in sections presses the membrane 108 against the surface 122 of the first mold 104. The absolute protrusion of the two seals 118 and 120 depends on the design of the seal that is being used.

The two seals 118 and 120 may comprise a foamed material or a plastic material that may be strongly compressed without suffering any damage so that the two molds may be moved towards each other up to a final position in the direction of the arrow A until the two surfaces 124 and 122 rest against each other.

In relation to the center axis M, outside the two seals 118 and 120 and outside the fibrous mat 112 on the first mold a further, third seal 126 may be affixed, whose protrusion is small, for example approximately 0.2 mm, when compared to the protrusion of the two seals 118 and 120. The third seal 126 may be to ensure that when the two molds 104 and 106 in the final position are closed to final dimensions the pressure within a cavity 128 may be maintained should the two seals 118 and 120 fail.

In the final position, in which the surfaces 122 and 124 rest against each other, in the closed molding tool 100 a cavity 128 or a hollow space 128 is formed which is formed by the section 130 of the second mold 106 and the section 132 of the first mold 104. The two sections 130 and 132 define the geometry of the composite component 129 to be manufactured.

The first mold 104 has a resin supply device 134 or resin-injection gate connection 134. Viewed from the center axis M the resin supply device 134 and a connection 117 of the fluid supply device 116 with the second region 114 are located within the two seals 118 and 120.

Figure 2:
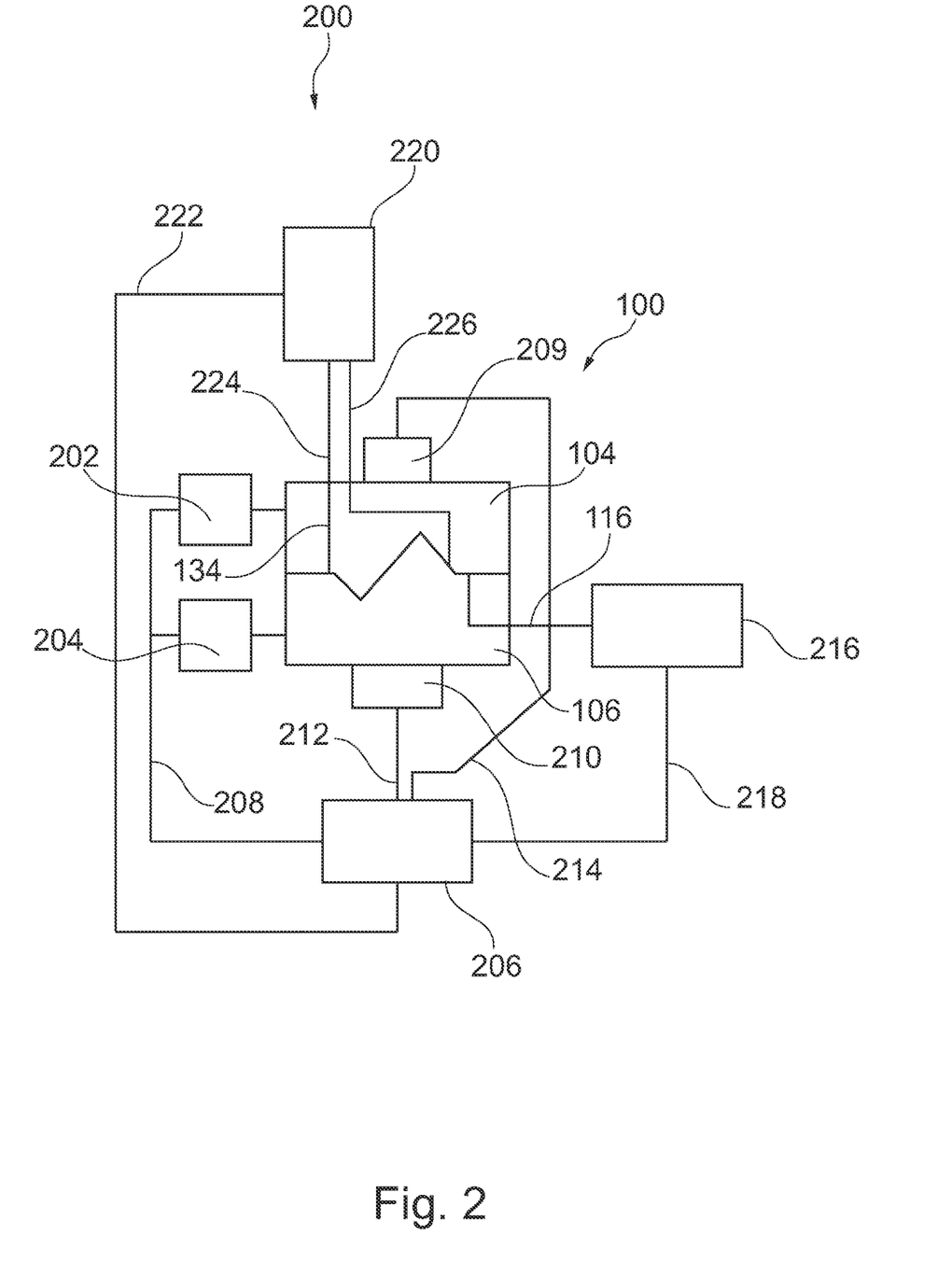
FIG. 2 shows a schematic diagram of a press arrangement in which a molding tool according to an exemplary embodiment is arranged.

FIG. 2 shows a schematic diagram of a press 200 in which the molding tool 100 is arranged. The first mold 104 and the second mold 106 may be moved towards each other or away from each other by way of lifting devices, lowering devices or closing devices 202 and 204. This movement is controlled by the control unit 206 by way of a signal line 208.

Furthermore, the first mold 104 may be heated to a predetermined temperature by way of a heating device 209, and the second mold 106 by way of a heating device 210. This temperature may be controlled by the control device 206 by way of the signal lines 212 and 214. As a result of the heated molds 104 and 106, in the resin in the molding tool a chemical reaction may be triggered or accelerated, by means of which reaction the resin cures.

The press arrangement 200 has a device 216 that may comprise a fluid reservoir, a pump, a valve and/or a suction device, and which may be controlled by the control device 206 by way of the signal line 218. By means of the pump or the suction plant in the device 216, by way of the fluid supply device 116, the second region 114 within the molding tool 100 may be pressurized with fluid, or the fluid may be removed from this region 114 by suction.

By way of a further signal line 222 the control device 206 may control a device 220 that may comprise a resin reservoir, a further pump, a further valve, a screw-conveyor and/or a further suction device. By way of the resin supply line 224 by way of the resin supply device 134, the device 220 may introduce resin to the first region 110 between the two tool halves or molds 104 and 106, and, by way of a further line 226, may lead away fluid, for example air, located in the second region 114 from the first region 110.

Figure 3:
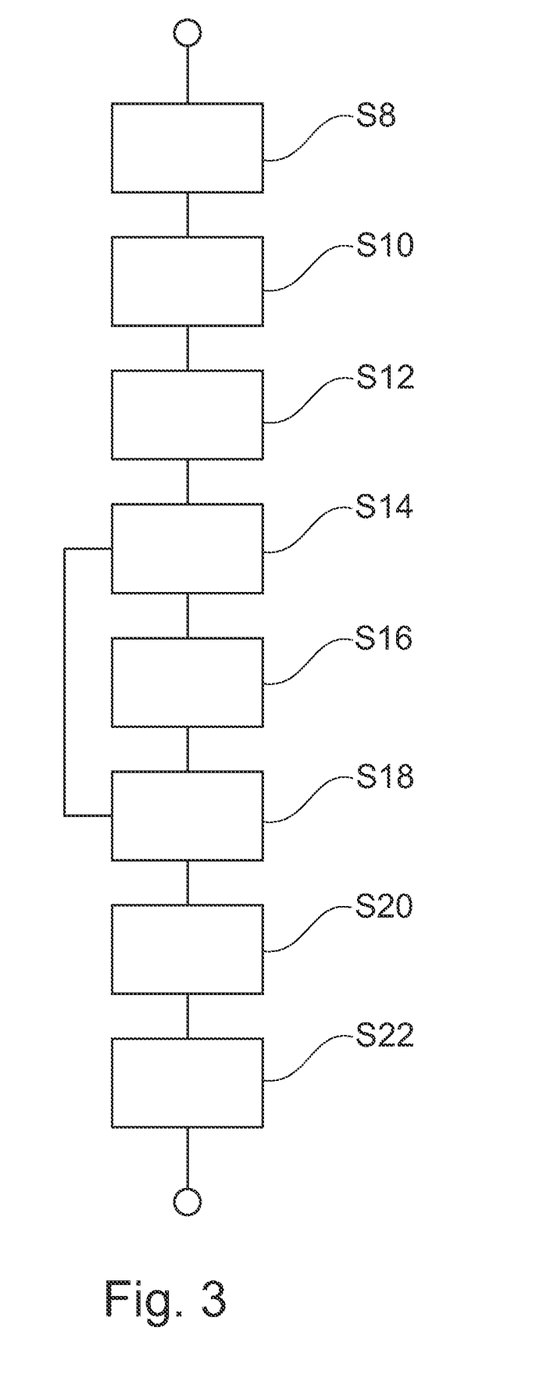
FIG. 3 shows a flow chart of the sequence of a method according to an exemplary embodiment.

FIG. 3 shows a flow chart that diagrammatically shows the sequence of the method according to an exemplary embodiment. In a first step S8 a membrane 108 is placed on the second mold 106 and a fibrous mat 112 is placed thereon.

In step S10 the molding-tool cavity will not be completely closed to the final dimension. To this effect the lifting devices, lowering devices or closing devices 202 and 204 move the two molds 104 and 106 towards each other from an open position of the molding tool until the intermediate position shown in FIG. 1 of the two molds 104 and 106 is reached. Moreover, the molds 104 and 106 may be heated in this step or in the other steps.

In the intermediate position the first region 110 and the second region 114 are then sealed, by the seals 118 and 120, with respect to the environment of the molding tool.

In step S12 the second region 114 between the membrane 108 and the second mold 106 is pressurized by way of the air supply device or the fluid supply device 116. To this effect the pump in the device 216 pumps air or a fluid from the fluid reservoir by way of the fluid supply device 116 into the second region 114.

In step S14 by means of the device 220 resin is conveyed from a resin reservoir by way of the resin supply line 224 and the resin supply device 134 in the molding tool 100 to the first region 110 between the membrane 108 and the first molding tool 104, for example by means of the pump or the screw-conveyor. At the same time the fluid located in the first region 110 or the air located therein is removed by suction, by way of the line 226, from the first region 110 by means of the device 220.

In step S16 the two molds 104 and 106 are moved towards each other to a final position in which the surfaces 122 and 124 of the molding tool rest against each other.

Concurrently to step S16 or after step S16 in step S18 the pressure in the first region 110 is increased over the pressure in the second region 114. As a result of this the pressure pad situated in the second region 114 starts to become smaller, and the fluid situated in the second region 114 starts to leave the aforesaid through the fluid supply device 116.

In a step S20 the fluid situated in the second region 114 is actively led away or discharged by reducing the pressure or by suction removal of the fluid. The membrane 108 then rests against the section 130 of the second mold 106. The resin-impregnated fibrous mat 112 completely fills the cavity 128 formed between the sections 130 and 132. While the two molds 104 and 106 move towards each other, excess resin may be pressed out by way of the resin supply device 134 or some other outlet.

In the final position of the two molding tools 104 and 106 the resin-impregnated fibrous mat 112 is enclosed on both sides by the rigid molds 104 and 106; both surfaces of the arising composite component 129 may be geometrically calibrated by the sections 130 and 132 of the two molds 104 and 106.

In a further step S22, by way of the fluid supply device 116, the resin supply device 134 or a residual closing distance of the molding tool, which distance is, for example, a few millimeters, dwell pressure or after pressure may be exerted while the molding tool 100 is closed, with the two molds 104 and 106 in the final position. In this manner the formation of pores in the composite component 129 may be prevented.

In addition, it should be pointed out that "comprising" does not exclude other elements or steps, and "a" does not exclude a plural number. Furthermore, it should be pointed out that features or steps which have been described with reference to one of the above exemplary embodiments may also be used in combination with other features or steps of other exemplary embodiments described above. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A molding tool for manufacturing a composite component, comprising:
a first mold;
a second mold;
a pressure generating means;
a first seal including a first protrusion; and
a third seal including a third protrusion; wherein between the first mold and the second mold, a membrane is arrangeable, so that between the first mold and the membrane a first region is formed, and between the second mold and the membrane a second region is formed;
wherein in the first region a fibrous mat is arrangeable and the fibrous mat is resin-impregnated or resin-impregnatable;
wherein in the second region with the use of the pressure generating means counter-pressure can be produced so that the membrane is pressed in the direction of the fibrous mat;
wherein the first seal seals the first region and the second region, the first seal is mounted to the first mold such that the first protrusion of the first seal extends from the surface of the first mold, the third seal is mounted to the first mold to seal the first region and the second region, and the third protrusion of the third seal extends from the surface of the first mold such that the third protrusion is smaller than the first protrusion, and
wherein the third seal is arranged more outside with respect to the first region and the second region than the first seal.

2. The molding tool of claim 1, further comprising:
a second seal for sealing the first region and the second region;
wherein the second seal is mounted to the second mold and has a second protrusion that extends over the surface of the second mold.

3. The molding tool of claim 1, further comprising:
a resin supply device,
wherein by way of the resin supply device resin for impregnating the fibrous mat can be supplied to the first region to the molding tool.

4. The molding tool of claim 3,
wherein the resin supply device is formed in the first mold.

5. The molding tool of claim 1,
wherein the pressure generating means comprises a fluid supply device,
wherein by way of the fluid supply device fluid for producing the counter-pressure can be supplied to the molding tool.

6. The molding tool of claim 5,
wherein the fluid supply device is formed in the second mold.

7. The molding tool of claim 1,
wherein a section of the first mold defines the surface geometry of a first side of the composite component, and a section of the second mold defines the surface geometry of a second side of the composite component.

8. The molding tool of claim 1,
wherein the first mold and the second mold can be moved towards each other until a final position is reached in which the first mold and the second mold rest against each other,
wherein in the final position a cavity is formed between the first mold and the second mold.

9. The molding tool of claim 8,
wherein the cavity defines the geometry of the composite component to be produced.

10. The molding tool of claim 1,
wherein the first mold and the second mold are movable towards each other up to an intermediate position in which the first mold and the second mold are further movable towards each other;
wherein in the intermediate position the first region is sealed with respect to the environment of the molding tool;
wherein in the intermediate position the second region is sealed with respect to the environment of the molding tool.

11. The molding tool of claim 1,
wherein the membrane is mechanically connected to the second mold.

12. A method for manufacturing a composite component, comprising the steps of:
arranging a fibrous mat in a first region between a first mold of a molding tool and a membrane arranged in the molding tool, the first mold including a first seal is mounted to the first mold such that a first protrusion of the first seal extends from a surface of the first mold;
moving the first mold and a second mold of the molding tool towards each other to an intermediate position in which a second region between the second mold and the membrane is sealed with respect to the environment of the molding tool, the first mold including a third seal mounted to the first mold to seal the first region and the second region, the third seal having a third protrusion that extends from the surface of the first mold, the third protrusion smaller than the first protrusion, the first seal seals the first region and the second region and the third seal is arranged more outside with respect to the first region and the second region than the first seal;
generating counter-pressure in the second region so that the membrane is pressed in the direction of the fibrous mat;
moving the first mold and the second mold towards each other to a final position, wherein in the final position a cavity is formed between the first mold and the second mold, which cavity defines the geometry of the composite component;
impregnating the fibrous mat with resin, before the first mold and second mold are moved to the final position.

13. The method of claim 12, further comprising the step of:
connecting the membrane to the fibrous mat.

14. The method of claim 12, further comprising the step of:
manufacturing the composite component for an aircraft.

\* \* \* \* \*